July 11, 1933.  E. SCHARNOWSKI  1,917,464
COLOR DISPLAYING DEVICE
Filed Oct. 27, 1931  3 Sheets-Sheet 1
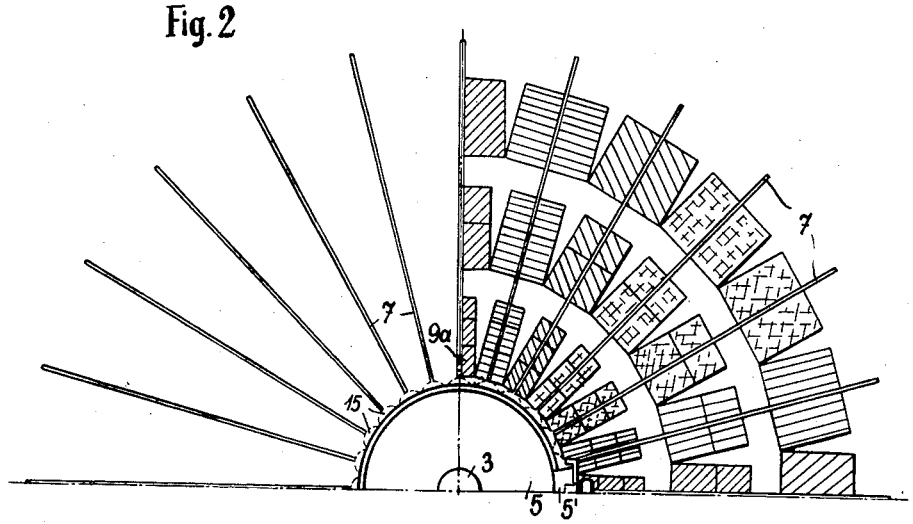
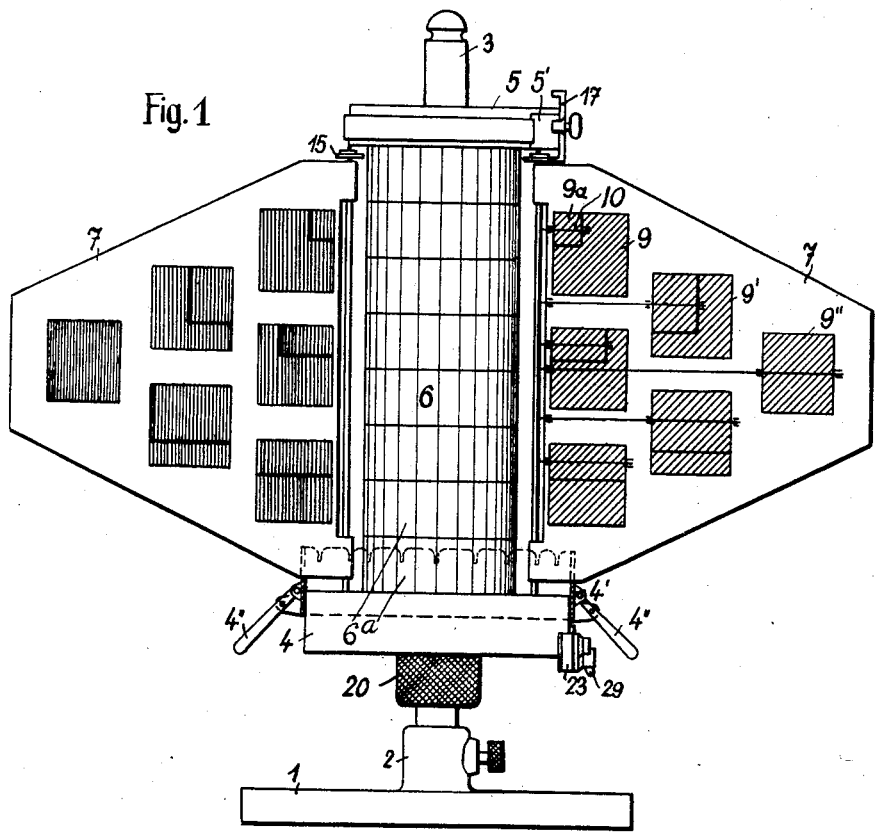
Inventor:
Ernst Scharnowski

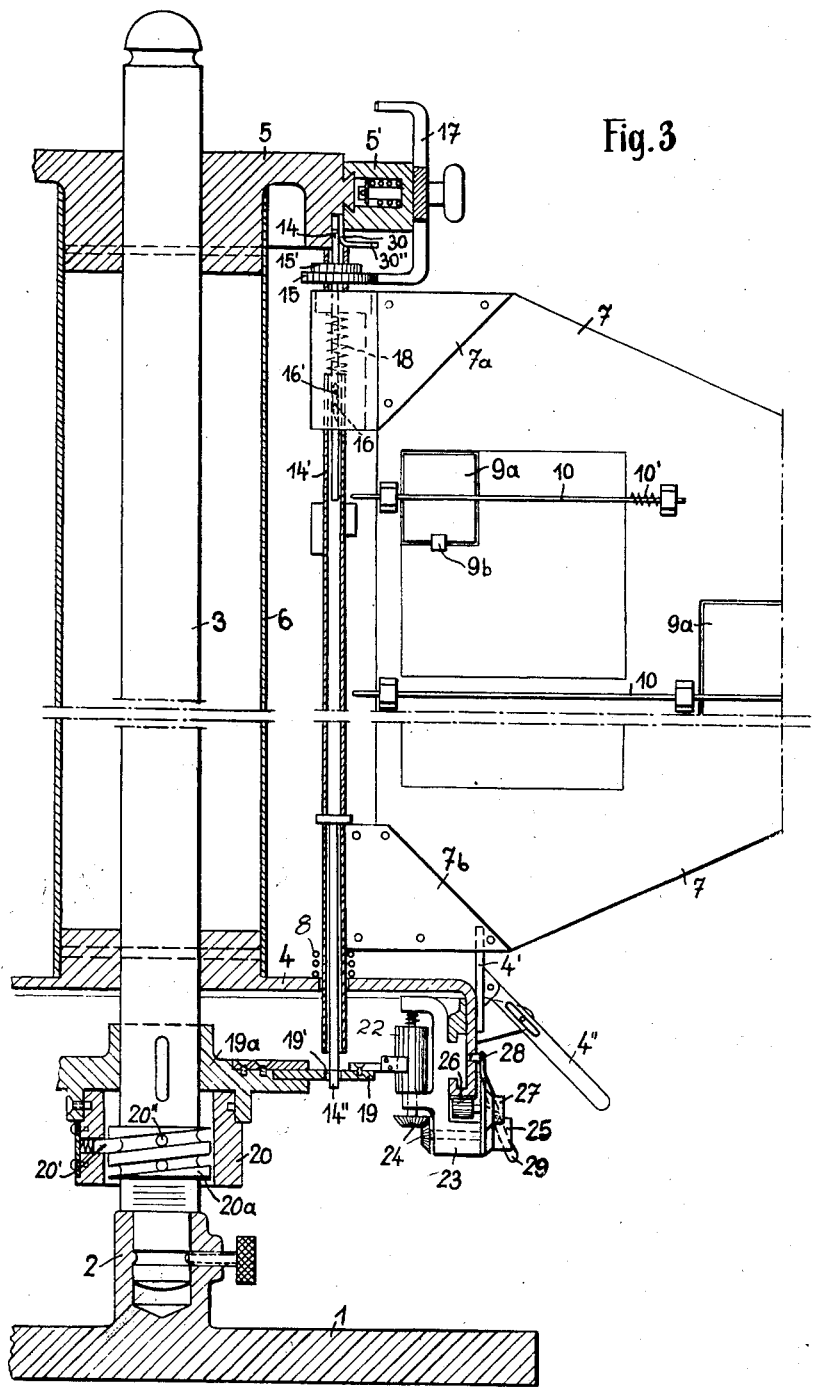

July 11, 1933.  E. SCHARNOWSKI  1,917,464
COLOR DISPLAYING DEVICE
Filed Oct. 27, 1931   3 Sheets-Sheet 3
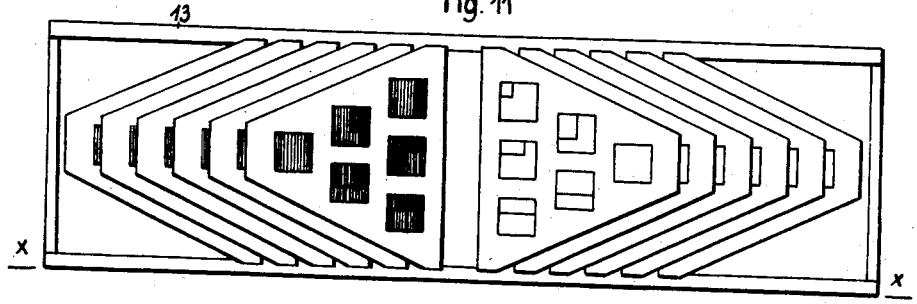
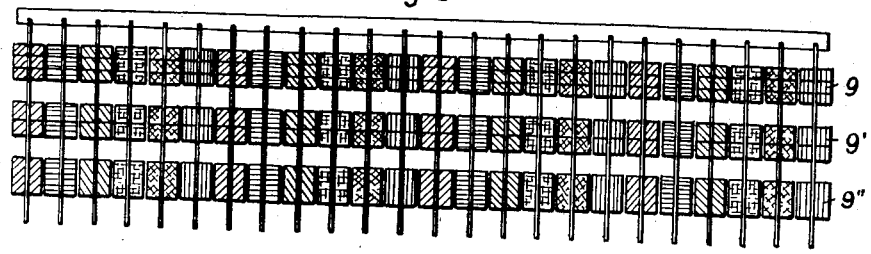
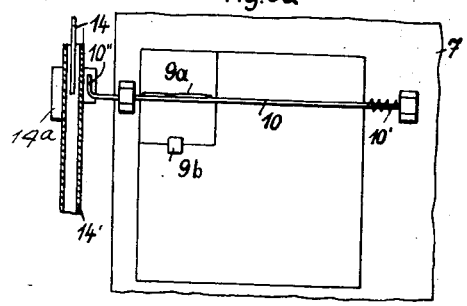
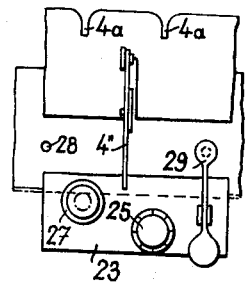
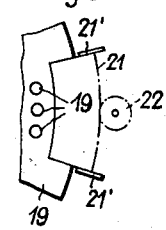
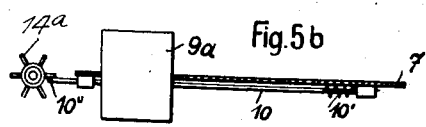
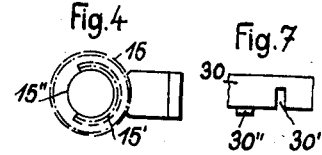
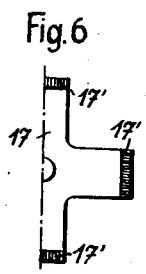
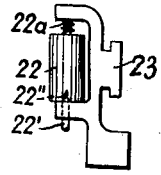
Inventor:
Ernst Scharnowski Patented July 11, 1933

1,917,464

UNITED STATES PATENT OFFICE

ERNST SCHARNOWSKI, OF GLEIWITZ, GERMANY

COLOR DISPLAYING DEVICE

Application filed October 27, 1931, Serial No. 571,441, and in Germany November 7, 1930.

The object of the present invention is to produce a device whereby the blending of colors of different shades may be effectively demonstrated particularly for teaching purposes, and the invention consists broadly in the provision of a support carrying, on parallel hinges, a plurality of plates bearing differently colored fields and fitted with hinged flaps which may be arranged in groups and which can be turned into a position at right angles to the plates for producing straight or circular bands of colors in imitation of the spectrum. Means are provided for a convenient selection of the flaps to form various color combinations. The plate support may consist of a cylinder in which case the structure may be rotated to effect a subjective superposition of the selected colors.

Fig. 1 of the accompanying drawings represents an elevation of a rotatable device according to the invention, Fig. 2 is a plan-view of the same, Fig. 3 is a sectional view on a larger scale showing the construction of the various mechanisms, Fig. 4 is a plan-view of a device for adjusting the flaps, Figs. 5a and 5b are views at right angles to each other of other parts of the flap adjusting device, Fig. 6 is a part view of another portion of the flap adjusting device, Fig. 7 is a part view of a retaining ring for the plate supporting shafts, Fig. 8 is a view of part of the flap selecting device, Fig. 9 is a plan-view of another part of this device, Fig. 10 is a view of a modified part of this device, Fig. 11 is a plan-view of a modified form of the color displaying device, and Fig. 12 is a view of the latter device as set for displaying the color bands and turned through 90°.

In the arrangement shown in Figs. 1 to 10 the device comprises a stand 2 fitted with a supporting base 1 and carrying a rotatable, vertical shaft 3. A cylinder 6 mounted on the shaft is fitted with flanges 4 and 5 which support a plurality of equidistant vertical shafts which are parallel to each other and to the cylinder. Each shaft carries a plate 7 which has the trapeziform shown in Fig. 1 and which is preferably made of cardboard. The cylinder 6 and preferably also the plates 7 may be provided with painted bands 6a graduating from white to black through different shades of grey. In addition each plate is provided with a plurality of fields 9 of a definite color but of different shades. The fields are arranged in groups. The first group may contain the lighter shades, the second group 9', the intermediate shades, and the single field 9'' at the free end of the plate may be the brightest. The plates can be turned about their shafts like the leaves of a book for the convenient examination of the different color fields. For the purpose of forming circular color bands as indicated in Fig. 2, each color field is, entirely or partly according to its position, composed of a flap 9a which is rotatable about an axis situated at right angles to the hinge of the plate so that it can be turned into a horizontal position and viewed from the top of the apparatus. For the formation of these bands, means are provided for securing the plates 7 in a radial position relative to the cylinder 6. The single fields 9'' are pivoted in this manner in their entirety to enable them to fill up the large spaces between the outer ends of the radially arranged plates. In the fields 9' and 9 the flaps are made correspondingly narrow owing to the restriction of the space, and in order to allow the lower flaps to be seen as well as the upper ones in the same group, the latter flaps are made shorter. Thus each color field can be made to participate in making up a band of a particular color and shade. The colors may be arranged in spectral order. Means are provided for selecting the flaps for adjustment, and when the cylinder is rotated by hand in the stand 2 through the medium of the shaft 3 with the flaps in the transverse position, the colors will be subjectively superimposed, and the effect of the blending of the different colors will be demonstrated. The flaps 9a are arranged in apertures in the plates, and the axis of rotation is situated midway of the flap as shown, so that one half of the flap will be visible at each side of the plate.

The preferred constructional details of the device are illustrated in Figs. 3 to 10.

Each plate supporting shaft is composed of telescopically adjustable parts. The central portion of each shaft consists of a tube 14' which is arranged to slide on a spindle 14 forming the upper portion of the shaft. A pin 16' on the spindle engages in a longitudinal slot 16 in the tube to prevent relatively rotary displacement. The lower portion of the shaft consists of a spindle 14" which is firmly connected to the tube 14'. An eyed hinge element 7a of metal at the upper edge of the plate 7 embraces the upper end of the tube 14', and a similar hinge element 7b at the lower edge of the plate embraces the spindle 14". The eye member of the lower hinge element is prolonged downwards and passes through an aperture in the flange 4, the plate being supported on the latter by a spring 8. The upper end of the spindle 14 engages in a recess in the flange 5 and is retained in the recess by a ring 30 which is rotatable about the flange. The ring is fitted with a handle 30" whereby it can be rotated, and it has a notch 30' which can be turned into register with any particular spindle for the removal of the shaft and plate from the apparatus.

The flaps 9a, only one of which is shown in Fig. 3 for the sake of clearness, are carried by arbors 10 each of which is extended beyond the inner edge of the plate and formed at the inner end with a crank 10" whereby the flap can be turned, in opposition to a spring 10', into a position at right angles to the plate 7. Normally the flaps bear, under the influence of the springs 10', against stops 9b which retain the flaps within the plane of the plate. For turning the flaps, the tube 14' is provided with radial wings 14a which are normally out of reach of the cranks and which are brought into operative engagement with the latter by raising the tube in opposition to a spring 18. The wings are of different lengths and require different adjusting movements of the tube for remaining in operative contact with the cranks. Thus, by raising the tube 14' to different levels and by turning it for bringing different wings into operative position, the flaps 9a can be selected as desired for forming the different color bands. For turning the tube so as to bring different wings into position for operating the cranks, the spindle 14 is fitted with two spur wheels 15 and 15'. A ring 5', which is rotatable about the flange 5, is fitted with a pivoted star piece 17. On the arms of this star piece racks 17' are provided any one of which can be set in operative position by a rotary adjustment of the star piece. The latter can for this purpose be pulled axially in position to a spring and then turned to bring a lug into engagement with different retaining slots for securing the star piece in the desired position. One of the racks 17' is carried by a shorter arm than the others and is adapted to engage the upper spur wheel 15' which is mutilated as shown at 15" in Fig. 4 and which serves for clearing the apparatus by bringing the tubes back to their normal positions, this being effected by turning the ring 5' once round the flange 5 so that all the spur wheels 15' will be swept by the clearing rack. The remaining racks are adapted to engage the spur wheel 15 and are of different lengths for turning the tubes 14' through different angles, for instance 60°, 120° and 180°. The turning of the flaps into the transverse position is effected by raising the adjusted tubes 14' so as to bring the selected wings into contact with the cranks, and a further selection of flaps is effected by raising different tubes through a definite distance. For this purpose a lifting disc 19 is arranged under the spindles 14" and formed with apertures 19' through which spindles which are not to be raised, can pass as shown in Fig. 3. The disc 19 is rotatably held in a carrier 19a which surrounds the shaft 3 and which is fastened to a sleeve 20. The latter embraces a screw threaded shaft portion 20a provided with a square thread. A spring-controlled pin 20' engages between the screw threads and causes a change in the elevation of the disc 19 when the sleeve 20 is rotated about the screw. Slots 20" are made in the screw for the reception of the pin 20' which can thus maintain the disc 19 in different altitudes. For turning the disc 19 so as to bring the apertures 19' into and out of alignment with the spindles 14", a segmental rack 21 is connected to the edge of the disc, and a long, vertical operating pinion 22 is in engagement with this rack. The pinion is mounted in the carrier 23 which is connected to the downturned rim of the flange 4. The rotation of the pinion is effected by means of a hand operated knob 25 and a shaft which transmits motion to the pinion through the medium of conical gears 24. To prevent an overstraining of the mechanism, the pinion is preferably operated by means of a stub-shaft 22' (Fig. 10) provided with a prismatic head 22" against which the pinion is pressed by means of a spring 22a. The head 22" is adapted to allow the pinion to slip under excessive stress, for instance when an attempt is made to turn the knob 25 while the disc 19 is engaged, as shown in Fig. 3, by one of the spindles 14". To prevent the pinion from leaving the rack 21, stops 21' are provided at the ends of the rack. The knob 25 may be provided with a graduated scale, and the carrier 23, with an index placed against said scale.

For further grouping and selection of flaps, the disc 19 may be rotated together with the pinion 22 and carrier 23 around the entire apparatus. For this purpose the carrier 23 is arranged to slide in a guideway on the rim of the flange 4, and the lower edge of the rim is provided with teeth 26 engaged by the pinion which is mounted in the carrier and operated by means of a knob 27. A spring catch 29, mounted on the carrier, is adapted to snap into apertures or recesses 28 on the rim of the flange for maintaining the carrier in the different positions.

Before each fresh setting of the device, the disc 19 should be lowered and the tubes 14' zeroized. The zeroizing is effected by turning the respective rack 17' into position to engage the spur wheel 15' and by subsequently turning the ring 5' so that all the wheels will be swept by the rack. Since the wheels 15' are mutilated, i. e., are without teeth on part of their circumference, the wheels can only turn through part of a revolution, and they will all be stopped with the mutilated part facing an outward direction. This is the zero position of the tubes. Then the star piece is reset so that one of its racks will be in position to engage the spur wheel 15 whereupon the ring 5' is turned through one revolution for turning all the tubes through the required angle. If a selection of tubes be required, this is now effected by turning the disc 19 through the medium of the knobs 25 and 27 whereupon the selected tubes are raised by means of the disc and the sleeve 20. As the tubes are raised, the cranks 10'' will be engaged by those wings 10a which are in operative position, and the respective color flaps will be turned into a horizontal position. The selection of the flaps is also dependent on the distance through which the tubes are raised.

The plate 7 can be turned freely about the supporting shafts for placing the colored fields in proper viewing position. For maintaining the plates in a radial position relative to the supporting cylinder 6 to form color bands, a vertically adjustable ring 4' is mounted on the flange 4, said ring being provided with equi-distant notches 4a in which the plates are engaged. The adjustment of the ring 4' for fixing and releasing the plates, may be effected by means of a pair of diametrically opposite levers 4'' which are pivoted to the ring and fulcrumed on brackets connected to the rim of the flange 4.

When straight instead of circular color bands are required, the plates may be hinged to a frame 13 as shown in Figs. 11 and 12. The color bands are formed, as before, by turning the flaps into a transverse position. To view these bands, the frame may be turned about the axis $x$ through 90° from the position shown in Fig. 11 to that shown in Fig. 12, the plates being then suspended from the frame so that the bands can be conveniently viewed. If the plates 7 be made of sheet metal instead of cardboard, the hinge elements 7a and 7b will be integral with the plates. The shape of the plates may be varied, and the flaps may be made to turn about their upper edges instead of about a central axis.

I claim:

1. A color displaying device comprising a support, a plurality of plates hinged to said support and movable about parallel hinges, and groups of differently colored and shaded flaps hinged to the plates and movable about axes arranged at right angles to the plate hinges.

2. A device as claimed in claim 1 wherein the flaps are arranged in apertures in the plates and movable about axes passing midway through the flaps.

3. A color displaying device comprising a cylinder, a plurality of plates hinged to said cylinder and movable about axes parallel to the cylinder axis, means for retaining the plates in radial position relative to the cylinder, and a plurality of differently colored flaps arranged in apertures in said plates and movable about axes arranged at right angles to the cylinder axis, said flaps being arranged in groups concentric with one another and with the cylinder, each group representing substantially the colors of the spectrum.

4. The structure claimed in claim 3 in combination with means for maintaining selected flaps in a position at right angles to the plates.

5. A color displaying device comprising an upright cylinder, a stand whereon said cylinder is rotatably supported, flanges at the ends of said cylinder, telescopically adjustable shafts held rotatably in the flanges parallel to the cylinder axis, a plate arranged to rotate about each shaft and supported on the bottom flange of the cylinder, a plurality of differently colored flaps arranged in apertures in each plate, a horizontal arbor carrying each flap on its plate and extending beyond the inner edge of the plate, a spring on each arbor tending to maintain the flap in the plane of the plate, a crank at the inner end of each arbor, radial wings on the shaft operated to engage said cranks selectively for turning the flaps into position at right angles to the plate, means for turning the shaft to bring different wings into position for operation, means for axially adjusting the shaft to bring the wings selectively into engagement with the cranks, and a ring adjustable on the lower flange of the cylinder and formed with notches with which to engage the plates and maintain them in a radial position relative to the cylinder.

6. The structure claimed in claim 5 in combination with a spring for maintaining each shaft extended, and means for preventing rotary displacement between the telescopic parts thereof.

7. A structure as claimed in claim 5 wherein the means for turning the shafts comprises spur wheels connected to the latter, a ring arranged rotatably about the upper flange of the cylinder, and a rack carried by the ring for engagement with said spur wheels.

8. A structure as claimed in claim 5 wherein the means for turning the shafts comprises spur wheels mounted on the shafts, a ring arranged rotatably about the upper flange of the cylinder, a star piece pivoted to said ring, and a plurality of racks of different lengths on the star piece adapted to be turned into position to engage and rotate said spur wheels on the ring being rotated.

9. A structure as claimed in claim 5 wherein the means for turning the shafts comprises a pair of spur wheels connected to each shaft one of said wheels being mutilated, a ring arranged rotatably about the upper flange of the cylinder, a star piece pivoted to said ring, a rack on said star piece adapted to be turned into position to engage the mutilated spur wheel for bringing the shafts back to normal position on the ring being rotated, and a plurality of racks of different lengths on said star piece adapted to be turned into position to engage the other spur wheel for turning the shafts through different angles.

10. A structure as claimed in claim 5 wherein the means for axially adjusting the shaft comprises a vertically adjustable sleeve mounted on the stand, a disc held rotatably by said sleeve under the shafts and formed with apertures which can, by a rotation of the disc, be aligned with given shafts, means for raising the sleeve and disc to adjust the shafts not in alignment with the apertures, and means for turning the disc to select the shaft for adjustment.

11. A structure as claimed in claim 5 wherein the means for axially adjusting the shaft comprises a vertically adjustable sleeve mounted on the stand, a disc held rotatably by said sleeve under the shafts and formed with apertures which can, by a rotation of the disc, be aligned with given shafts, means for raising sleeve and disc to adjust the shafts which are not in alignment with the apertures, a segmental rack carried at the edge of the disc, a long vertical pinion supported by the flange and engaging said rack, and means for turning the pinion to select the shaft for adjustment.

12. A structure as claimed in claim 5 wherein the means for axially adjusting the shaft comprises a vertically adjustable sleeve mounted on the stand, a disc held rotatably by said sleeve under the shafts and formed with apertures which can, by a rotation of the disc, be aligned with given shafts, means for raising sleeve and disc to adjust the shafts which are not in alignment with the apertures, a segmental rack carried at the edge of the disc, a long vertical pinion supported by the flange and engaging said rack, a knob for turning said pinion to select the shafts for operation, a graduated scale on said knob, and a stationary index placed against said knob.

13. A structure as claimed in claim 5 wherein the means for axially adjusting the shaft comprises a vertically adjustable sleeve mounted on the stand, a disc held rotatably by said sleeve under the shafts and formed with apertures which can, by a rotation of the disc, be aligned with given shafts, means for raising sleeve and disc to adjust the shafts not in alignment with the apertures, a segmental rack carried at the edge of the disc, a long vertical pinion carried by the flange and engaging the rack, means for turning the pinion to select the shafts for operation, and stops at the ends of the racks to prevent the pinion from leaving the latter.

14. A structure as claimed in claim 5 wherein the means for axially adjusting the shafts comprises a vertically adjustable sleeve mounted on the stand, a disc held rotatably by said sleeve under the shafts and formed with apertures which can, by a rotation of the disc, be aligned with given shafts, means for raising sleeve and disc to adjust the shafts which are not in alignment with the apertures, a segmental rack carried at the edge of the disc, a long vertical pinion carried by the flange and engaging said rack for turning the disc to select the shafts for operation, an operating knob for said pinion, gears transmitting motion from the knob to the pinion, and a snap-coupling between the gears and the pinion enabling the latter to slip under excessive stress.

15. A structure as claimed in claim 5 wherein the means for axially adjusting the shafts comprises a vertically adjustable sleeve mounted on the stand, a disc held rotatably by said sleeve under the shafts and formed with apertures which can, by a rotation of the disc, be aligned with given shafts, means for raising sleeve and disc to adjust the shafts which are not in alignment with the apertures, a segmental rack carried at the edge of the disc, a long vertical pinion engaging the rack for turning the disc to select the shafts for operation, and a carrier for the pinion arranged to slide about the lower flange of the cylinder for an extensive rotation of the disc.

16. A structure as claimed in claim 5 wherein the means for axially adjusting the shafts comprises a vertically adjustable sleeve mounted on the stand, a disc held rotatably by said sleeve under the shafts and formed with apertures which can, by a rotation of the disc, be aligned with given shafts, means for raising sleeve and disc to adjust the shafts which are not in alignment with the apertures, a segmental rack carried at the edge of the disc, a long vertical pinion engaging the rack for turning the disc to select the shafts for operation, a carrier for said pinion arranged to slide about the lower flange of the cylinder, a toothed rim on said latter flange, and a pinion on the carrier engaging said rack for an extensive rotation of the disc.

17. A structure as claimed in claim 5 wherein the means for axially adjusting the shafts comprises a vertically adjustable sleeve mounted on the stand, a disc held rotatably by said sleeve under the shafts and formed with apertures which can, by a rotation of the disc, be aligned with given shafts, means for raising sleeve and disc to adjust the shafts which are not in alignment with the apertures, a segmental rack carried at the edge of the disc, a long vertical pinion engaging the rack for turning the disc to select the shafts for operation, a carrier for said pinion arranged to slide about the lower flange of the cylinder, a toothed rim on said latter flange, a pinion on the carrier engaging said rim for an extensive rotation of the disc, and a resilient catch on the carrier adapted to engage in apertures in the flange for retaining the carrier in different positions.

18. A structure as claimed in claim 5 wherein the means for axially adjusting the shafts comprises a vertical screw carried by the stand below and in alignment with the cylinder, a sleeve surrounding said screw, a pin in the sleeve engaging the screw thread for causing axial adjustment of the sleeve on the latter being rotated, and a disc carried by the sleeve under the shafts for engaging and adjusting the latter.

19. A structure as claimed in claim 5 wherein the means for axially adjusting the shafts comprises a vertical screw carried by the stand below and in alignment with the cylinder, a sleeve surrounding the screw, a spring-controlled pin engaging the screw thread and adapted to snap into slots in the screw for maintaining the sleeve on the latter in different elevations, and a disc carried by the sleeve under the shafts for engaging the latter and determining the axial adjustment thereof.

20. The structure claimed in claim 5 in combination with means for adjusting the ring to engage and release the plates, said means comprising diametrically opposite levers pivoted to the ring, and brackets on the flange whereon said levers are fulcrumed.

21. A structure as claimed in claim 5 wherein the upper flange is formed with recesses for the reception of the upper ends of the shafts, and a retaining ring for the shafts arranged rotatably on the flange, said ring having a notch forming a gateway through which the shafts can be detached from the recesses.

22. A structure as claimed in claim 1 wherein the support comprises a frame across which the plates are hinged.

ERNST SCHARNOWSKI.